(12) United States Patent
Clymer et al.

(10) Patent No.: US 7,433,959 B2
(45) Date of Patent: *Oct. 7, 2008

(54) METHOD AND APPARATUS FOR RETRIEVING ACCESS CONTROL INFORMATION

(75) Inventors: Andrew M. Clymer, Chippenham (GB); Darran Potter, Kent (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/801,936

(22) Filed: May 10, 2007

(65) Prior Publication Data

US 2007/0214499 A1    Sep. 13, 2007

Related U.S. Application Data

(63) Continuation of application No. 10/310,572, filed on Dec. 4, 2002, now Pat. No. 7,225,263.

(51) Int. Cl.
    *G06F 15/16*    (2006.01)
(52) U.S. Cl. .................. 709/229; 709/217; 709/219; 709/227; 713/150; 713/168; 713/170
(58) Field of Classification Search .............. 709/217, 709/219, 227, 229; 713/150, 168, 170
See application file for complete search history.

(56) References Cited

U.S. PATENT DOCUMENTS

| | | | | |
|---|---|---|---|---|
| 6,088,451 A | * | 7/2000 | He et al. ............ | 726/8 |
| 6,339,830 B1 | * | 1/2002 | See et al. ............ | 726/15 |
| 6,463,474 B1 | * | 10/2002 | Fuh et al. ............ | 709/225 |
| 6,553,375 B1 | * | 4/2003 | Huang et al. ............ | 707/10 |
| 6,609,154 B1 | * | 8/2003 | Fuh et al. ............ | 709/225 |
| 6,928,558 B1 | * | 8/2005 | Allahwerdi et al. ............ | 726/9 |
| 2004/0097217 A1 | * | 5/2004 | McClain ............ | 455/411 |
| 2005/0254651 A1 | * | 11/2005 | Porozni et al. ............ | 380/270 |

* cited by examiner

Primary Examiner—Nathan J. Flynn
Assistant Examiner—Mohamed Wasel
(74) Attorney, Agent, or Firm—Hickman Palermo Truong & Becker LLP (57) ABSTRACT

Creating and storing troubleshooting information for providing access control information to a network device involves receiving a provisioning of control lists, and associations of the ACLs to users of the device. During authenticating a user login, a name of a first ACL is provided to the device, selected from among the ACLs based on the associations. A request is received from the device for a first ACL that is associated with a user of the device. The request includes the name of the ACL. The first ACL is sent to the network device in response to the request. Embodiments may use RADIUS for communicating ACLs from an authentication server to a firewall. A de-fragmentation approach enables downloading ACLs that exceed the maximum RADIUS packet size. Using an ACL renaming approach the firewall updates its cache when a user subsequently logs in and the corresponding ACL has changed.

26 Claims, 6 Drawing Sheets

METHOD AND APPARATUS FOR RETRIEVING ACCESS CONTROL INFORMATION

This application claims priority and benefit under 35 U.S.C. 120 as a Continuation of application Ser. No. 10/310,572, filed Dec. 4, 2002, now U.S. Pat. No. 7,225,263 the entire contents of which are hereby incorporated by reference for all purposes as if fully set forth herein.

FIELD OF THE INVENTION

The present invention generally relates to controlling access to computer networks. The invention relates more specifically to a method and apparatus for retrieving access control information.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computer networks can use a combination of network access devices and authentication, access and accounting (AAA) servers to control access through the network. Such devices and servers determine whether to grant access to a particular user based in part on access control information. In many of devices and servers, the access control information is implemented as one or more access control lists (ACLs). For a particular user, an access control list identifies, by network address or other identifier, which network resources the user is permitted to access. The access control lists are either defined on each device, or defined in the AAA server and downloaded to the device when the user is successfully authenticated. Often, many devices or users have the same or overlapping sets of ACLs.

In one past approach, both ACLs and Dial Plans are established on a router or other device. Each user who may use the device is assigned to a particular Dial Plan. The Dial Plan is associated with an ACL on the device. When a particular user logs in, the device determines which Dial Plan contains the user, and then applies the ACL of that Dial Plan to access requests of the user.

In another approach, where ACLs are defined on the device, each ACL is given a name. A user successfully authenticates through use of a message exchange between the device and an authentication server using an agreed-upon authentication protocol, such as Remote Access Dial-In User Service ("RADIUS"). RADIUS is described in IETF Request for Comments (RFC) 1812. A RADIUS response received by the device from the authentication server contains the name of an ACL to associate with the user. This approach provides the advantage that the device only contains one copy of the ACL, even if multiple users reference or use the same ACL. Thus, ACL definition is normalized. However, a disadvantage of this approach is that the ACL associated with the user is defined inside the authentication server, and the body and meaning of the ACL are defined in numerous devices. This presents scalability issues, because updating an ACL requires updating numerous devices.

Currently, authentication servers address this problem by using ACL management applications that deploy ACLs to numerous devices with a single request. However, network administrators perceive this solution as undesirable, because security policy is not managed in a central location, which can lead to misunderstandings and mis-configuration of the ACLs.

In another approach, the authentication server contains a full and complete copy of all ACLs, and each ACL is downloaded in full every time a user logs in. This places responsibility for ACL assignment and definition in one place, but has several disadvantages. First, the device never knows if user A and user B share the same ACL, and thus keeps copies of the same ACL, or parts of the same ACL (aggregated ACL's). In certain switch devices and in other cases, this unnecessarily consumes optimized resources that are provided for ACL management, such as content addressable memory (CAM) provided in switches for accelerated ACL management. Second, significant network bandwidth is used to download each ACL when a user logs in. Third, in RADIUS implementations, the maximum RADIUS packet size is 4 Kbytes; consequently, no ACL can exceed 4 Kbytes in size, which is an undesirable limitation.

Based on the foregoing, there is a clear need in this field for a better way to provide network access information to network devices.

In particular, what is needed is a solution that provides central administration of network access information, including both definition and assignment to users, to ensure scalability. There is also a need for a solution that supports network access information, such as ACLs, that are larger than 4 Kbytes.

Further, there is a need for a way to deploy network access information on demand, and uniform ally across all devices. There is also a need for a solution that provides normalized definitions of network access information, to provide efficient use of device memory.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for retrieving access control information is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview of an Embodiment
3.0 Example Implementation Using PIX and ACS
   3.1 Overview
   3.2 Operational Description
   3.3 Fragmentation Process for Large ACLs
   3.4 Updating Process
4.0 Summary of Features of Various Embodiments
5.0 Implementation Mechanisms—Hardware Overview
6.0 Extensions and Alternatives 1.0 General Overview The needs identified in the foregoing Background, and other needs and objects that will become apparent for the following description, are achieved in the present invention, which comprises, in one aspect, a method for creating and storing troubleshooting information for providing access control information to a network device. A provisioning of one or more access control lists, and one or more associations of the access control lists to users of the network device, are received. As part of authenticating a user login request, a name of a first access control list is provided to the network device, selected from among the one or more access control lists that based on the associations. A request is received from the network device for a first access control list that is associated with a user of the network device. The request includes the name of the access control list. The first access control list is sent to the network device in response to the request.

Embodiments may use RADIUS packets for communicating ACLs from an authentication server to a firewall, and a de-fragmentation approach is disclosed for downloading ACLs that exceed the maximum RADIUS packet size. Further, using an ACL renaming approach the firewall is forced to update its cache when a user subsequently logs in and the corresponding ACL has changed in the interim.

In other aspects, the invention encompasses a computer apparatus and a computer-readable medium configured to carry out the foregoing steps.

2.0 Structural and Functional Overview of an Embodiment

Figure 1:
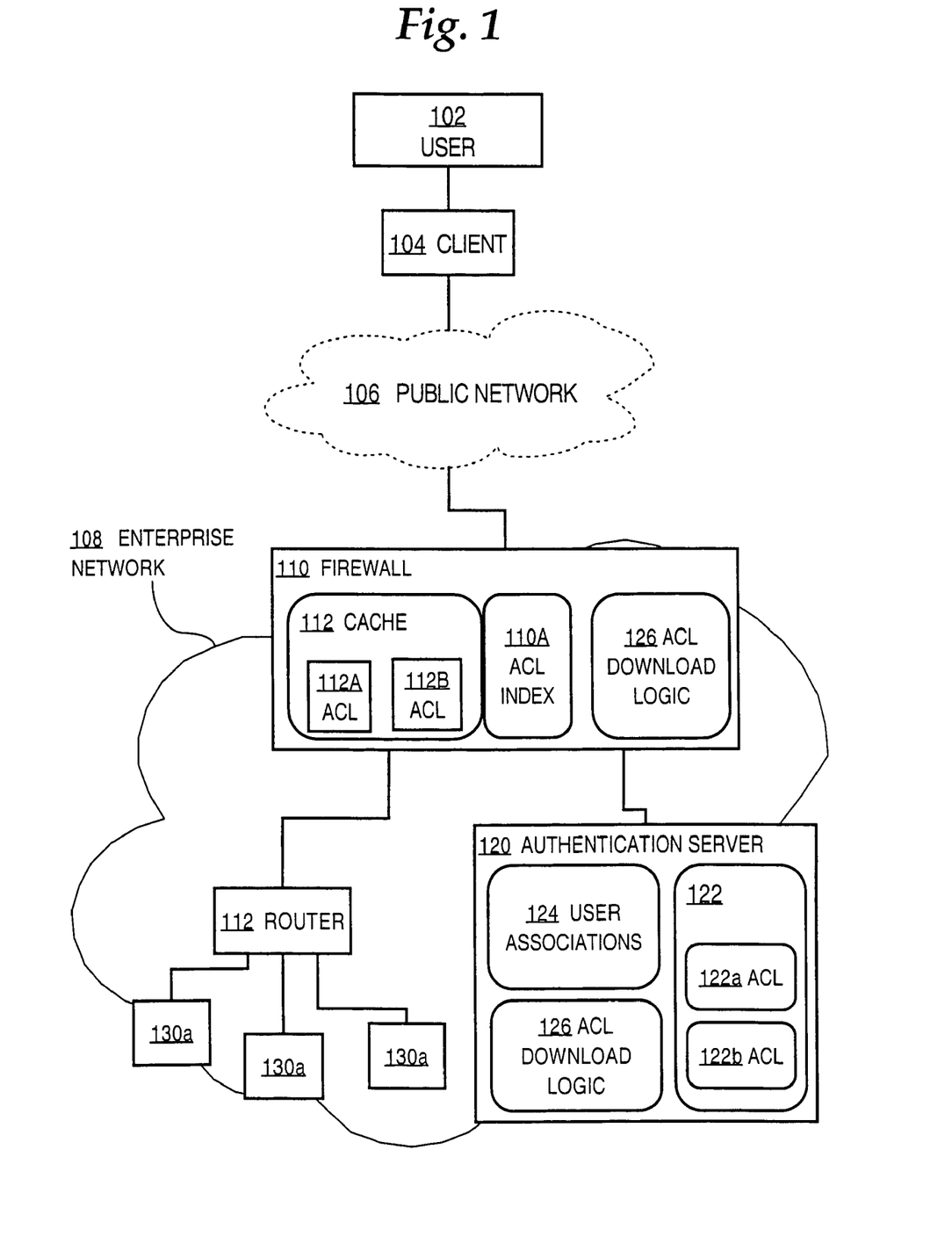
FIG. 1 is a block diagram that illustrates an overview of a network arrangement that may be used to implement an embodiment.

FIG. 1 is a block diagram that illustrates an overview of a network arrangement that may be used to implement an embodiment. A user 102 is associated with a client 104 that is communicatively coupled, directly or indirectly through one or more public networks 106, to a firewall 110 of an enterprise network. The client 104 is any network end station device such as a workstation, personal computer, or other device or process. Network 106 is one or more local area networks, wide area networks, or internetworks, alone or in combination.

Enterprise network 108 represents a secure network domain containing one or more network resources 130*a*, 130*b*, 130*n*. Enterprise network contains a firewall 110, access router 112, and authentication server 120. Firewall 110 receives all requests of non-trusted hosts, such as client 104, for access to network resources 130*a*, 130*b*, 130*n* and determines whether to admit or deny the requests. Firewall 110 may be implemented as a software process hosted on a router, such as the PIX® firewall from Cisco Systems, Inc., San Jose, Calif.

Authentication server 120 securely stores user authentication information. Authentication server 120 can respond to requests from firewall 110 to determine whether user identifying information received from a particular user 102 indicates that the user is who he purports to be. In one embodiment, authentication server 120 also performs access and accounting functions, and therefore the authentication server is termed an authentication, access and accounting (AAA) server. Further, in one embodiment, firewall and authentication server 120 communicate using a protocol optimized for communicating messages relating to authentication, such as RADIUS. A commercial example of authentication server 120 is Cisco Access Control Server (ACS) 3.0, from Cisco Systems, Inc.

Authentication server 120 stores network access information 122 for a plurality of users. In one embodiment, network access information 122 is a database or other repository of one or more access control lists 122*a*, 122*b*. Each ACL 122*a*, 122*b* is named with a unique identifier. Authentication server 120 further stores user associations 124, which comprise data associating each user that can potentially communicate with the enterprise network 108 to one of the ACLs 122*a*, 122*b*. For purposes of illustrating a simple example, two ACLs 122*a*, 122*b* are shown in FIG. 1; however, in a practical embodiment, there may be any number of ACLs stored in authentication server 120.

Authentication server 120 further comprises ACL download logic 126, which consists of programmatic objects, instructions or other software elements configured to download ACLs 122*a*, 122*b* to firewall 110 upon request. Functions of ACL download logic 126 are described further below.

Firewall 110 stores an ACL index 110*a* and has a data store that stores ACLs 112*a*, 112*b*. For example, a cache 112 may store the ACLs; however, any firewall 110 may have any other suitable form of data store to locally store the ACLs. ACL index 110*a* is a list of the names of all ACLs that are stored in cache 112. ACLs 112*a*, 112*b* are copies of ACLs from authentication server 120 that are downloaded on demand, using the processes described herein, and cached for re-use when an associated user attempts a future login.

Firewall 110 further comprises ACL download logic 115, which consists of programmatic objects, instructions or other software elements configured to determine whether an ACL for a particular user is present in cache 112 or ACL index 110A, request ACLs 122*a*, 122*b* from authentication server 120 and perform other functions. Functions of ACL download logic 115 are described further below.

Figure 2A:
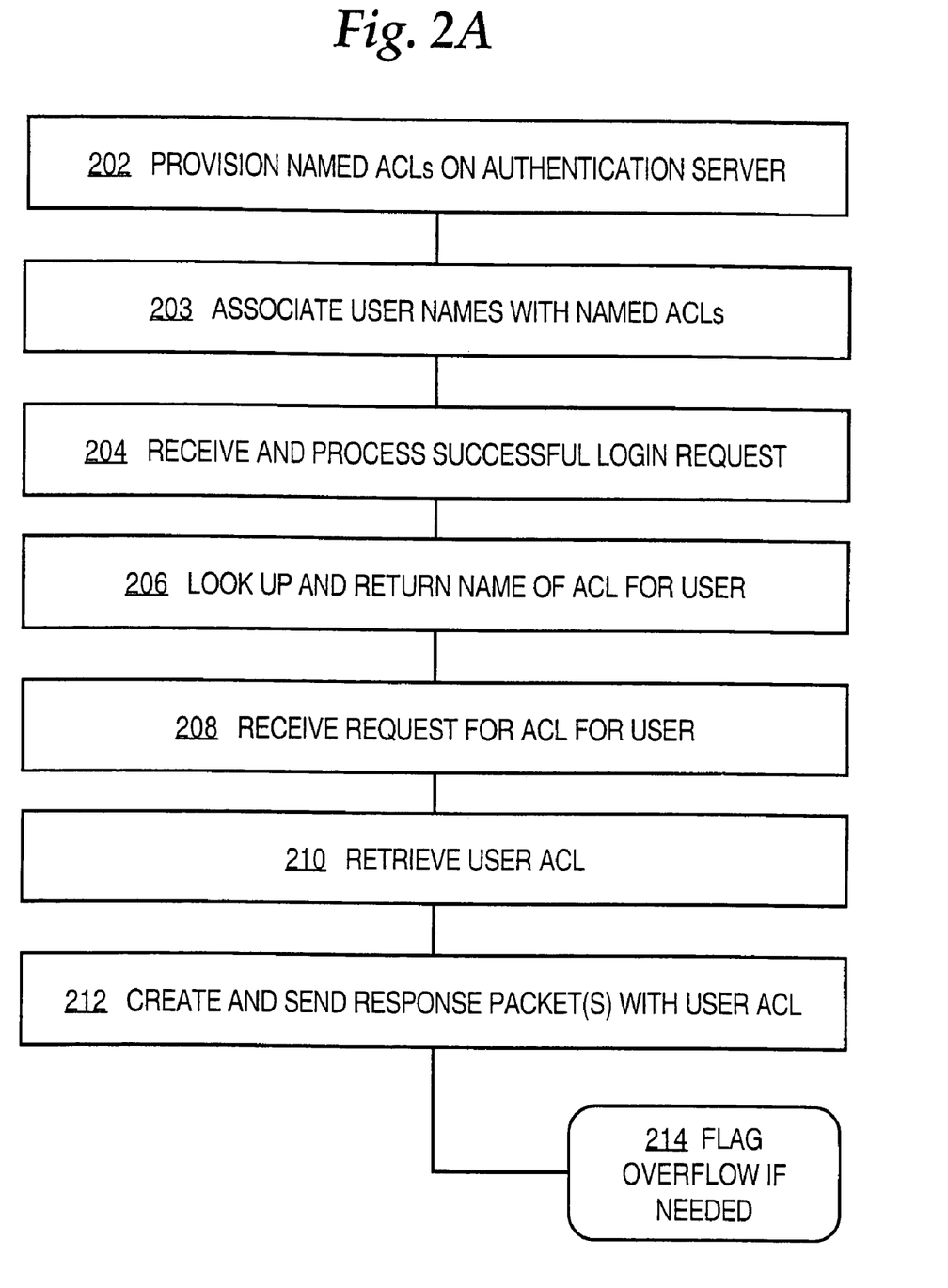
FIG. 2A is a flow diagram that illustrates a high level overview of one embodiment of a method for retrieving network access information.

FIG. 2A is a flow diagram that illustrates a high level overview of one embodiment of a method for retrieving network access information. For purposes of illustrating a clear example, FIG. 2A is described below with reference server steps that can be performed by an authentication server in the network arrangement of FIG. 1. However, FIG. 2A is a process that can be implemented with any authentication server and network arrangement.

In block 202, one or more named access control lists are provisioned on an authentication server. For example, ACLs 122*a*, 122*b* are provisioned on authentication server 120. Each access control list has a unique name. In block 203, each user name known to the authentication server is associated with one of the named ACLs. For example, user associations 124 are created and stored on provisioning server 120.

In block 204, a login request is received and processed; for purposes of illustrating the example herein, the login request is assumed successful. For example, assume that user 102 at client 104 successfully logs in to the network by contacting firewall 110, which authenticates the user using a RADIUS message exchange with authentication server 120. In block 206, the authentication server looks up and returns the name of the ACL that corresponds to the user. For example, authentication server 120 performs a lookup in user associations 124 and retrieves a name of one of the ACLs 122a, 122b that corresponds to user 102.

In block 208, a request is received to provide the ACL corresponding to the user. For example, authentication server 120 receives a request from firewall 110 to provide the ACL for which a name was previously returned, and which corresponds to the user 102. In one embodiment, the request of block 208 comprises a new authentication request in which the requested ACL name is placed in a username attribute of the request, and having a null value as its password attribute. The request of block 208 is received in response to firewall 110 determining that it does not have the ACL for the user in the ACL cache 112, as indicated by ACL index 110A. The determination step by firewall 110, and other steps that the firewall can perform in certain embodiments, are described further below.

In block 210, the ACL for the user is retrieved. For example, authentication server 120 retrieves ACL 122a from network access information 122. In block 212, one or more response packets containing the retrieved ACL are created and sent. If the length of the body of the retrieved ACL exceeds a maximum allowed packet size for the protocol used for communication by the authentication server, then a fragmentation process is used to send the ACL in multiple packets. As indicated in block 214, such an overflow is flagged in particular packets, if needed. A description of a fragmentation process is provided below.

Figure 2B:
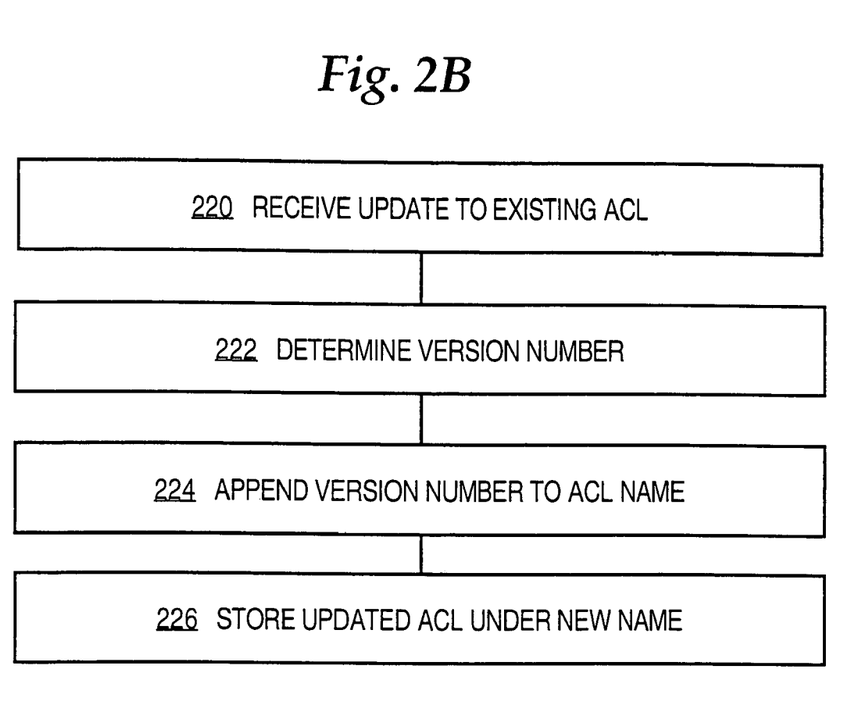
FIG. 2B is a flow diagram that illustrates a process for updating network access information.

FIG. 2B is a flow diagram that illustrates a process for updating network access information. In block 220, an update to an existing ACL is received. For example, a network administrator may edit and save an updated version of ACL 122a on authentication server 120. In block 222, the then-current version number of the original ACL is determined. In block 224, an updated version number is created and appended to the name of the updated ACL. In block 226, the updated ACL is stored under the updated name.

Using this approach, the name of an ACL is changed whenever the ACL is updated. Accordingly, when the process of FIG. 2A is performed, the firewall will not find the updated ACL in its cache, because the names of the prior version and the updated version of the same ACL are different. Thus, the firewall automatically will request the updated ACL from the authentication server. This ensures that the firewall always uses the latest version of a particular ACL.

3.0 Example Implementation Using Pix and ACS 3.1 Overview

Figure 3A:
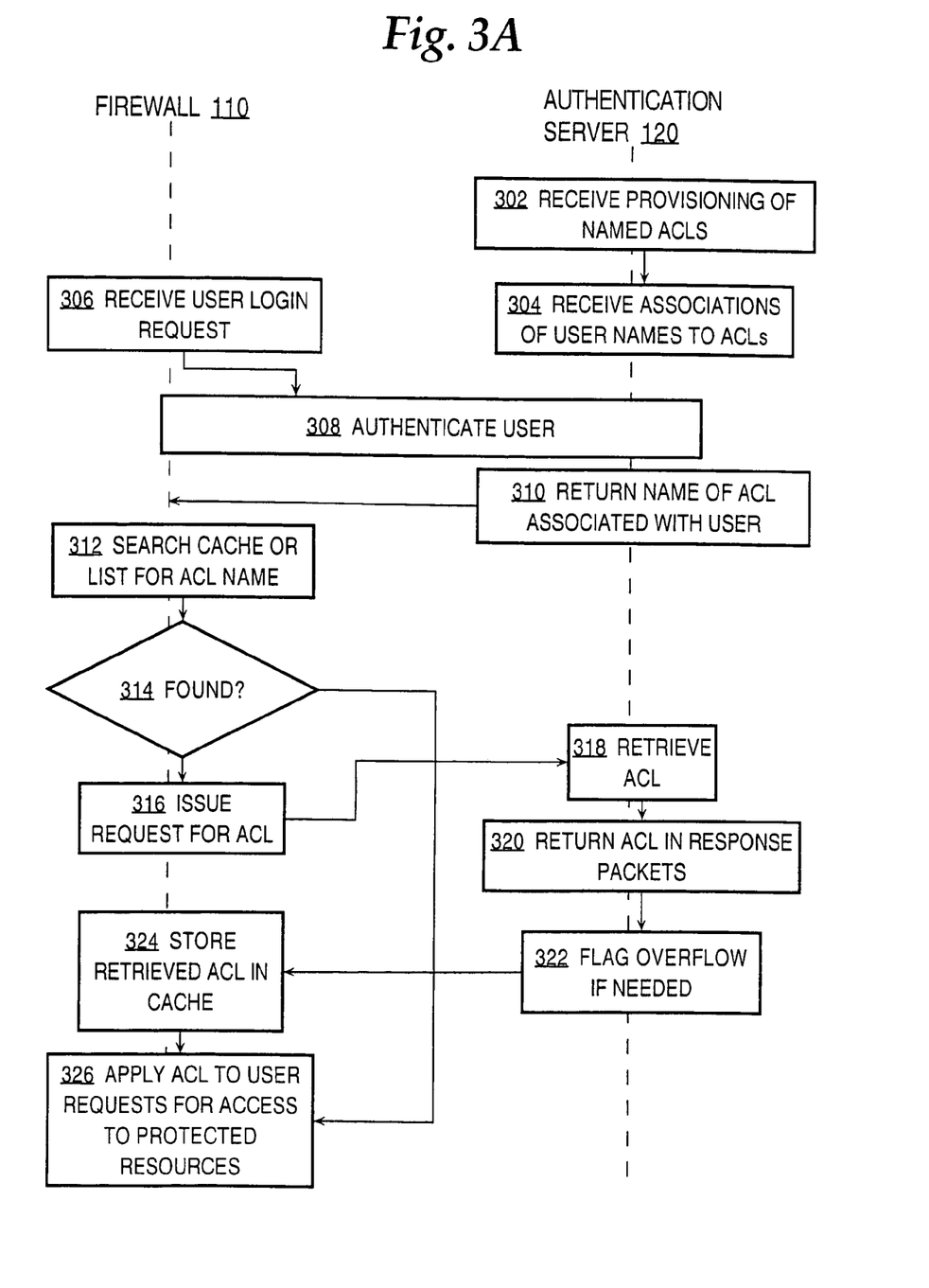
FIG. 3A is a flow diagram that illustrates a process of communication among a firewall and an authentication server for retrieving network access information.

An example implementation of the foregoing general processes, using a Cisco PIX firewall and Cisco ACS AAA server, is now described with reference to FIG. 3A, which is a flow diagram that illustrates a process of communication among a firewall and an authentication server for retrieving network access information. In this implementation, ACLs of an arbitrary length may be configured and downloaded. A packet fragmentation process uses RADIUS protocol mechanisms to allow downloading ACLs that are longer than the 4 Kbyte packet limit that is conventionally imposed on a single RADIUS packet. The design facilitates the operation of a sophisticated caching and versioning scheme in conjunction with the PIX. This minimizes unnecessary network traffic and use of bandwidth. Costly ACL downloads occur only when a new ACL needs to be downloaded, or when a refresh of the PIX firewall cache is needed because an ACL has been updated on the ACS.

3.2 Operational Description

To minimize network traffic, ACLs are downloaded using a two-stage communication process. In block 302, authentication server 120 receives provisioning of one or more named ACLs. Each ACL is configurable on the ACS as a Shared Profile Component (SPC) having a unique identifier or name.

In block 304, associations of user names to ACLs are received. For example, once configured as a named SPC, an ACL name may be included in any RADIUS profile of an ACS group or user. Thus, the RADIUS profile provides an association of an ACL name to a user name. When a RADIUS message attribute with a named ACL is returned to a PIX firewall as part of a session RADIUS access accept packet for a user, the PIX firewall applies that ACL to that session of the user.

In block 306, a user login request is received at firewall 110. In block 308, firewall 110 and authentication server 120 cooperate to authenticate the user. For example, the PIX firewall issues a RADIUS authentication request packet for the requisite user session. For purposes of illustrating a specific example, assume that a user "fred" is defined in the ACS database and has been assigned the ACL set "myAcl". The ACL set contains enough ACLs to require more than one RADIUS packet. In this example, the access request issued by the firewall 110 includes the following attributes:

```
User-Name[1] = "fred"
User-Password[2] = <whatever>
...
<Other attributes>
...
```

If authentication is successful, in block 310 the authentication server 120 returns a name of an ACL associated with the user. For example, the ACS returns a RADIUS Access Accept packet containing the named ACL set for that user. The ACL is packaged within the Cisco VSA AV-Pair:

"ACS:CiscoSecure-Defined-ACL=<acl set name>".

The access accept packet from the ACS for user Fred, comprising an authentication response and ACL set assignment, could have the following form:

```
AV-Pair[26/9/1] = "ACS:CiscoSecure-Defined-ACL=#ACSACL#-myAcl-1e45bc4890fa12b2
...
<Other attributes>
...
```

The PIX firewall checks the returned profile and examines the returned ACL set name. In block 312, firewall 110 searches its cache for the returned ACL set name. If the firewall already has a valid cache entry for the named ACL set, as tested in block 314, the communication is complete and the PIX applies the ACL it has cached, as shown in block 326. If the ACL set has not previously been downloaded, so that the result of the test of block 314 is negative, the PIX issues a new RADIUS authentication request using the ACL set name as the username in the RADIUS request and along with a null password attribute, as shown in block 316. For user Fred, the request may comprise the following attributes:

User-Name = "#ACSACL#-myAcl-1e45bc4890fa12b2"
...
   <Other attributes>
...

Upon receipt of a RADIUS authentication request packet containing a username attribute containing the name of an ACL set, at block 318 the ACS accepts the authentication, retrieves the requested ACL from its repository, and responds with an access accept packet containing the individual ACLs comprising the named set. The ACL may have any desired type. The ACL is returned in one or more response packets, as indicated by block 320, and stored by the firewall in its cache at block 324. In one embodiment, ACLs are packaged using Cisco AV-Pair vendor-specific attributes (VSAs) in the RADIUS response packet:

Av-pair = "ip:inacl#1 = <acl 1>
Av-pair = "ip:inacl#2 = <acl 2>

The appended numeric values ("#1", "#2") specify an evaluation order for the ACL. In one embodiment, the appended numeric values correspond to the order in which individual ACL entries appear within the ACS configuration, and hence the configuration on the firewall.

3.3 Fragmentation Processing for Large ACLs

Figure 3B:
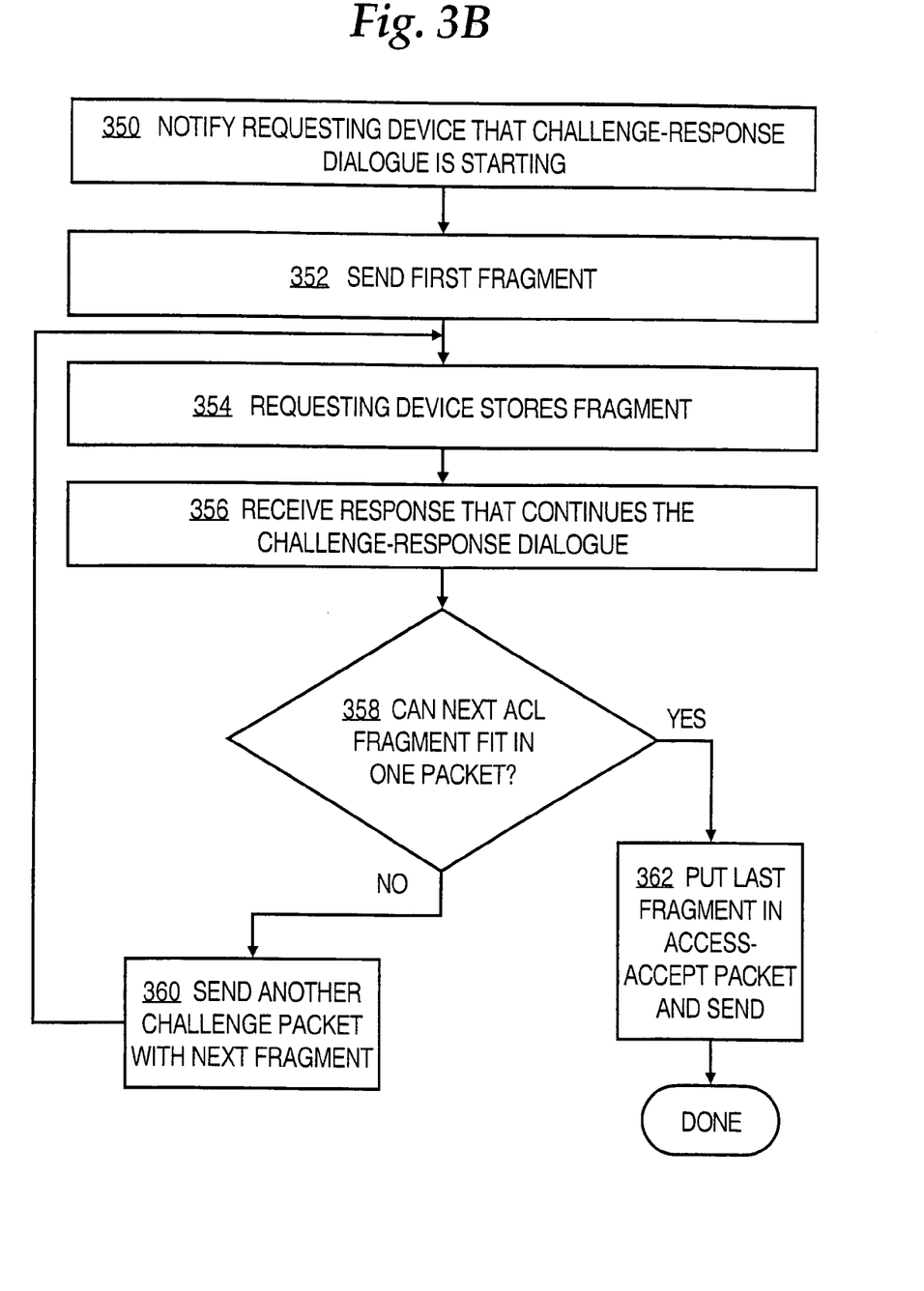
FIG. 3B is a flow diagram of a fragmentation process that can be used.

When the ACL to be returned at block 320 is greater than 4 Kbyte in length, block 320 and block 322 involve additional steps that implement a fragmentation process, which is required to overcome the 4 Kbyte RADIUS packet length limitation. FIG. 3B is a flow diagram of a fragmentation process that can be used. In one embodiment, the fragmentation processes uses the iterated challenge/response capabilities provided by the RADIUS protocol as described in IETF RFC 1812.

When a long ACL is to be transmitted, at block 320, instead of transmitting a RADIUS access-accept packet, the ACS notifies the requesting device of the start of a challenge-response dialogue, as shown by block 350. In one embodiment, authentication server 120 sends firewall 110 a RADIUS access-challenge packet containing the following attributes:

| RADIUS Attribute | # | Contents |
| --- | --- | --- |
| State | 24 | ACS 'control data' |
| Cisco AV-Pairs | 26/9/1 | First block of ACLs |

The presence of the state attribute, and the use of an access-challenge packet, signal that this packet is part of a challenge-response dialogue. For user Fred in the above example, the packet may comprise the following attributes:

State[24] = "TBD"
AV-Pair[26/9/1] = "ip:inacl#1 = permit tcp any any established"
AV-Pair[26/9/1] = "ip:inacl#2 = permit ip any any"
...
<ACLs 3..59>
...

-continued

AV-Pair[26/9/1] = "ip:inacl#60 = deny icmp 2.2.2.0 0.0.0.255 9.9.9.0 0.0.0.255"

The requesting device stores the provided fragment into a buffer, as shown by block 354, and continues the challenge/response dialogue by sending another access-request packet. The response that continues the dialogue is received at block 356. In one embodiment, the response contains the following attributes:

| RADIUS Attribute | # | Contents |
| --- | --- | --- |
| Username | 1 | ACL set name requested |
| Password | 2 | Null password |
| State | 24 | ACS 'control data' that is copied from the preceding access-challenge packet by the requesting device and is 'opaque' to it. |

At block 358, a test is performed to determine whether the next ACL fragment can fit in one packet. If not, then in block 360, upon receipt of the response packet specified above, the ACS continues the dialogue by responding with another access-challenge packet as before. As indicated by arrow 361, this process continues until the last ACL fragment can fit within a single RADIUS packet. At this point, control passes to block 362, in which the ACS sends the final ACL fragment within an access-accept packet, and thereby signals to the firewall or other requesting device that the download is complete.

For the example given above for user Fred, an access request from the firewall for a next ACL fragment may comprise the following attributes:

User-Name = "#ACSACL#-myAcl-1e45bc4890fa12b2"
State[24] = "TBD"
...

The access accept message from the ACS, indicating that the final ACL fragment has been returned, may comprise the following attributes:

State[24] = "TBD"
AV-Pair[26/9/1] = "ip:inacl#61 = permit tcp 1.1.1.0 0.0.0.255 15.15.15.0 0.0.0.255"
AV-Pair[26/9/1] = "ip:inacl#62 = permit icmp 1.1.1.0 0.0.0.255 9.9.9.0 0.0.0.255"

Each ACL fragment packet contains only complete ACL av-pairs. Hence ACS will "round down" to the nearest number of complete ACLs that will fit into any given packet. The maximum size for any given ACL fragment will be somewhat less than the 4K packet limit, to allow for the packet header and any other attributes automatically included by the ACS. This size is configurable within the ACS.

If an error occurs within the ACS during the challenge/response cycle, an access-reject will be returned to the firewall. In this case, the firewall can either attempt to restart the ACL set download, try re-authenticating the user from scratch.

This fragmentation approach uses a sequential dialogue that provides the fragments in time order, with only a single fragment ever outstanding at one time. The design also provides robust operation in the face of three standard RADIUS timeout mechanisms:

1. ACS does not receive a request—Operating in standard RADIUS client/server mode, the ACS only responds to requests it receives. If a requesting device fails during the challenge-response dialogue process, no action is required from the ACS to recover. Upon receipt of the next request, ACS responds as usual.

2. Requesting device does not receive response from ACS—If at any stage in the sequential process, the requesting device does not receive a response from the ACS in the specified timeout (as configured for the RADIUS process for the device), it can re-send the request. Upon receipt of duplicate requests by the ACS that it has already responded to, ACS simply resends the same response, recognizing that the requesting device did receive its response.

3. ACS is re-started during an ACL download cycle.—The control data included in the State attribute will allow ACS to continue the download from where it left off. There is a small chance that the ACL may have been edited using the administrative interface of the ACS, in which case the download is aborted, because the particular version of the ACL will no longer exist. In this event the ACS, responds with an access-reject packet.

3.4 Updating Process

A requesting device, such as firewall 110, is completely unaware of changes made to ACLs by the ACS administrator. Therefore, a mechanism is required to enable the device to receive and apply changed ACLs. The process herein provides such a mechanism by using a hash value that is derived from a time stamp on the ACL. All maintenance of this mechanism is undertaken on the ACS, with no modification of the requesting device.

Using the ACS administrative interface, ACLs are stored by user definable name. However, the actual name stored in the ACS database for an ACL is a combination of the name defined by the ACS administrator and a 64-bit number derived from a hash of the then-current date and time. Hence, editing an ACL set with the ACS administrative interface actually results in a change to the full set name to reflect the new timestamp.

The changed name is placed by the ACS into a RADIUS access-accept packet for an individual user for whom an ACL is defined within an access profile on the ACS and returned as the ACL name pointer to the requesting device. When the requesting device receives this name pointer for use with that user, the device looks up the name pointer in its cache. If the device already has an ACL by that name, no further action is needed and it applies the ACL version identified in the cache. If it does not have the new version, then the required ACL is downloaded from the ACS using the process described above. All control/operation of the caching scheme is under direction of the requesting device.

4.0 Summary of Features of Various Embodiments

A process has been described in which each ACL provisioned on the AAA server is given an ACL name. In the AAA server, usernames are associated with an ACL name. More than one user can be associated with the same ACL name. A user logs in to the network in conventional manner, which involves authentication of a username and password by the AAA server. As part of successful authentication, the AAA server returns a RADIUS attribute that contains the ACL name of the ACL that is associated with the user. The firewall examines the ACL name and determines, through a list of known ACL names or a similar structure, whether the firewall 'knows', i.e., has previously received, the named ACL. If the firewall does not know the ACL, the firewall issues a RADIUS request to the AAA server and provides the ACL name in the username field.

Based on seeing the ACL name in the username field, the AAA server interprets the RADIUS request as a request to receive the entirety of the named ACL. In response, the AAA server returns the body of the named ACL in a RADIUS packet. If the ACL body overflows the maximum RADIUS packet size, the AAA server places a flag value in the state attribute of the RADIUS packet, which signals the firewall that the AAA server needs to send additional packets with more of the ACL body. The firewall caches the ACL for re-use when the same user logs in again later or for use when another user logs in who is associated with the same ACL.

It is possible that an administrator may update a named ACL at the AAA server after the ACL has been downloaded to the firewall. Thus, there is a need to easily move the updates to the firewalls. Our approach overcomes this by appending a version number value to the name of an ACL name each time that the ACL is modified by the administrator. The modified ACL is automatically downloaded by the firewall the next time that the associated user logs in, using the logic outlined above. This occurs because at the time of that login, the firewall will not find the modified ACL name in its list of the cache contents, and therefore the firewall will request and receive the modified ACL from the AAA server. No separate code or logic is needed to support updates.

Accordingly, ACLs are entered once, maintained in one location, and easily downloaded to firewalls automatically when needed. Memory use at the firewall is greatly reduced because only one copy of an ACL is stored even if multiple users require the same ACL. Updates are supported without special code or logic.

Embodiments provide a completely centralized solution in which the full ACL not just the name pointer is downloaded from the authentication server to the requesting device as part of a RADIUS authentication/authorization accept packet for a particular user's session. All ACLs are entered and maintained upon the authentication server using its administrative interface. ACLs entered upon the authentication server are protected by the backup or replication regime administered on the authentication server.

The complexity of configuring a firewall is significantly reduced, as no additional configuration is required once the firewall has been configured to undertake authorization using a particular protocol. This is particularly beneficial when multiple client devices have to be configured, because there is no requirement to enter the associated ACLs on each individual firewall.

5.0 Implementation Mechanisms—Hardware Overview

Figure 4:
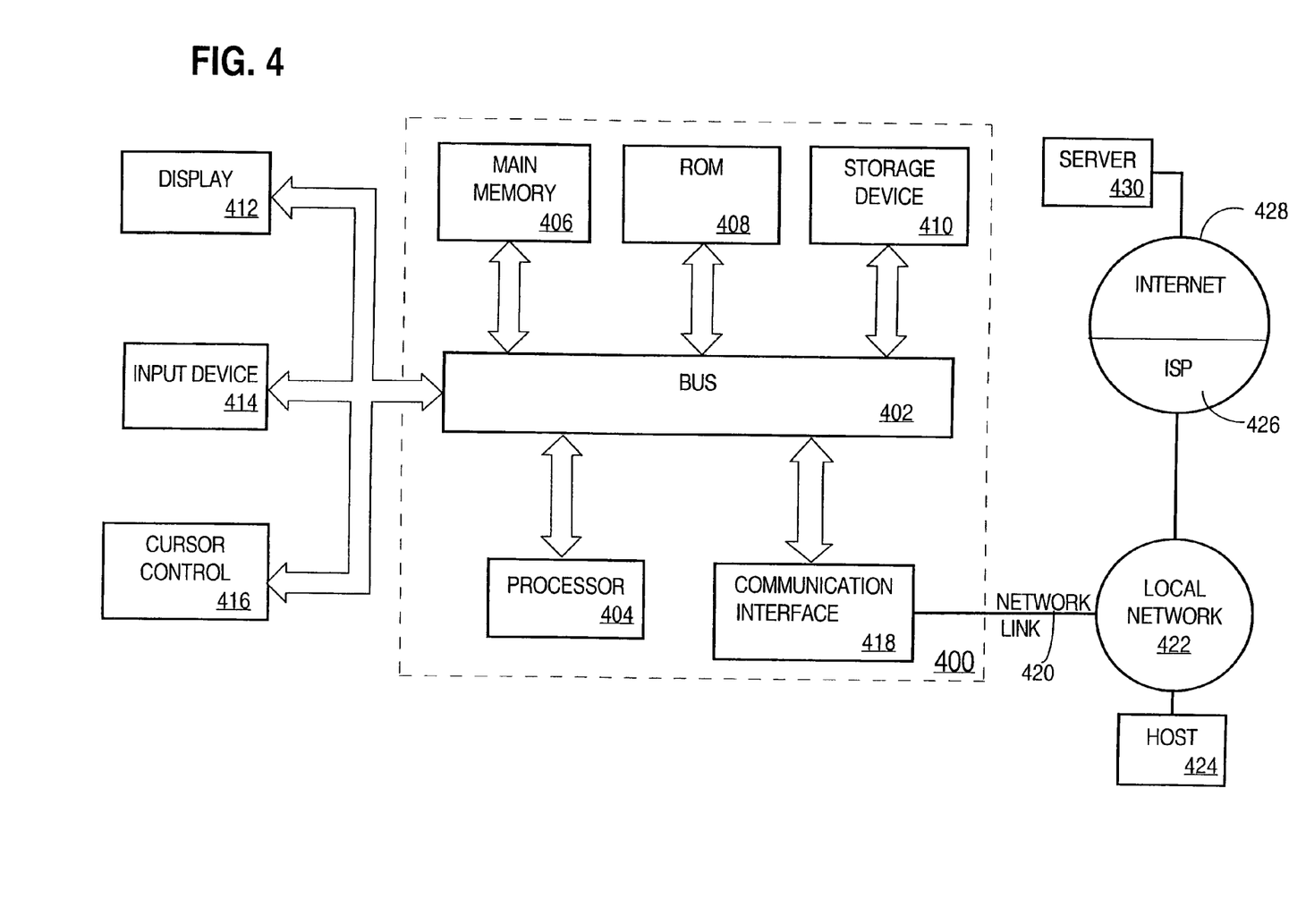
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for retrieving access control information. According to one embodiment of the invention, retrieving access control information is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for retrieving access control information as described herein.

The received code may be executed by processor 404 as it is received, and/or stored in storage device 410, or other non-volatile storage for later execution. In this manner, computer system 400 may obtain application code in the form of a carrier wave.

6.0 Extensions and Alternatives

In the foregoing specification, the invention has been described with reference to specific embodiments thereof. However, it will be evident that various modifications and changes may be made thereto without departing from the broader spirit and scope of the invention. The specification and drawings are, accordingly, to be regarded in an illustrative rather than a restrictive sense.

What is claimed is:

1. A method comprising the computer-implemented steps of:

receiving a provisioning of one or more router access control lists, and one or more associations of the access control lists to users of the network device;

wherein each access control list specifies network addresses of one or more of the users, associated network addresses for network resources that are available to corresponding users and a value indicating whether the corresponding users can access the available network resources;

providing to the network device, as part of authenticating a user login request, a name of a first access control list from among the one or more access control lists that is selected based on the associations;

receiving a request from the network device to obtain the first access control list that is associated with a user of the network device, wherein the request includes the name;

sending the first access control list to the network device in response to the request; and wherein sending the first access control list to the network device in response to the request comprises sending the first access control list to the network device in an acceptance packet;

notifying the network device that a challenge-response dialogue is starting;

receiving a response that continues the challenge-response dialogue.

2. The method as recited in claim 1, performed by an access, authentication, and accounting (AAA) server, and further comprising the step of processing a login request of a particular user of the network device.

3. The method as recited in claim 1, wherein the request from the network device for the first access control list comprises an authentication request that contains a name of the first access control list in a username attribute.

4. The method as recited in claim 1, further comprising processing a login request of a particular user of the network device; providing, to the network device, a name of the first access control list that is associated with the particular user.

5. The method as recited in claim 1, further comprising receiving an update to a first access control list among the one or more access control lists; appending a version identifier to a then-current name of the first access control list, to result in creating an updated name for the first access control list; and storing the first access control list using the updated name.

6. The method as recited in claim 1, wherein receiving a request from the network device comprises receiving the request from the network device for the first access control list only when the network device does not have the first access control list in a data store at the network device.

7. The method as recited in claim 1, performed by an access, authentication, and accounting (AAA) server, and wherein the network device is a firewall.

8. A method of retrieving access control information, the method comprising the computer-implemented steps of:

authenticating a login request from a user by communicating with an access, authentication, and accounting (AAA) server;

receiving from the AAA server a name of a router access control list that is associated with the user;

wherein the access control list specifies network addresses of the user, associated network addresses for network resources that are available to the user and a value indicating whether the user can access the available network resources; determining whether the access control list is in a local data store of a router;

when the access control list is not in the local data store of a router, sending a request to the AAA server to provide the access control list, receiving by the router a first access control list from the AAA server, and storing the first access control list in the local data store of the router;

receiving a notification from the AAA server that a RADIUS challenge-response dialogue is starting;

sending a response that continues the challenge-response dialogue.

9. The method as recited in claim 8, further comprising receiving a subsequent login request from the user; receiving an updated name of an updated version of the first access control list; and repeating the determining, sending, receiving the first access control list, and storing, with respect to the updated name of the updated version of the first access control list.

10. The method as recited in claim 8, wherein receiving the first access control list comprises receiving the first access control list in a RADIUS Access-Accept packet as part of authenticating the login request.

11. The method as recited in claim 8, performed by a firewall.

12. A computer-readable storage medium carrying one or more sequences of instructions for providing access control information to a network device, which instructions, when executed by one or more processors, cause the one or more processors to perform:

receiving a provisioning of one or more router access control lists, and one or more associations of the access control lists to users of the network device;

wherein each access control list specifies network addresses of one or more of the users, associated network addresses for network resources that are available to corresponding users and a value indicating whether the corresponding users can access the available network resources;

providing to the network device, as part of authenticating a user login request, a name of a first access control list from among the one or more access control lists that is selected based on the associations;

receiving a request from the network device to obtain the first access control list that is associated with a user of the network device, wherein the request includes the name;

sending the first access control list to the network device in response to the request; and wherein sending the first access control list to the network device in response to the request comprises sending the first access control list to the network device in an acceptance packet.

13. An apparatus for providing access control information to a network device, comprising:

means for receiving a provisioning of one or more router access control lists, and one or more associations of the access control lists to users of the network device;

wherein each access control list specifies network addresses of one or more of the users, associated network addresses for network resources that are available to corresponding users and a value indicating whether the corresponding users can access the available network resources;

means for providing to the network device, as part of authenticating a user login request, a name of a first access control list from among the one or more access control lists that is selected based on the associations;

means for receiving a request from the network device to obtain the first access control list that is associated with a user of the network device, wherein the request includes the name; and means for sending the first access control list to the network device in response to the request; and wherein the means for sending the first access control list to the network device in response to the request comprises means for sending the first access control list to the network device in an acceptance packet.

14. The apparatus as recited in claim 13, comprising an access, authentication, and accounting (AAA) server, and further comprising means for processing a login request of a particular user of the network device.

15. The apparatus as recited in claim 13, wherein the request from the network device for the first access control list comprises an authentication request that contains the name of the first access control list in a username attribute.

16. The apparatus as recited in claim 13, further comprising means for processing a login request of a particular user of the network device and means for providing, to the network device, a name of the first access control list that is associated with the particular user.

17. The apparatus as recited in claim 13, further comprising means for receiving an update to a first access control list among the one or more access control lists; means for appending a version identifier to a then-current name of the first access control list, to result in creating an updated name for the first access control list; and means for storing the first access control list using the updated name.

18. The apparatus as recited in claim 13, wherein the means for receiving a request from the network device comprises means for receiving the request from the network device for the first access control list only when the network device does not have the first access control list in a data store at the network device.

19. The apparatus as recited in claim 13, comprising an access, authentication, and accounting (AAA) server, and wherein the network device is a firewall.

20. An apparatus comprising:
a network interface that is coupled to the data network for receiving one or more packet flows therefrom;
a processor;
one or more stored sequences of instructions which, when executed by the processor, cause the processor to perform:
receiving a provisioning of one or more router access control lists, and one or more associations of the access control lists to users of a network device;
wherein each access control list specifies network addresses of one or more of the users, associated network addresses for network resources that are available to corresponding users and a value indicating whether the corresponding users can access the available network resources;
providing to the network device, as part of authenticating a user login request, a name of a first access control list from among the one or more access control lists that is selected based on the associations;
receiving a request from the network device to obtain the first access control list that is associated with a user of the network device, wherein the request includes the name;
sending the first access control list to the network device in response to the request; and
wherein sending the first access control list to the network device in response to the request comprises sending the first access control list to the network device in an acceptance packet;
notifying the network device that a challenge-response dialogue is starting;
receiving a response that continues the challenge-response dialogue.

21. The apparatus as recited in claim 20, comprising an access, authentication, and accounting (AAA) server, and further comprising sequences of instructions which, when executed by the processor, cause the processor to perform the step of processing a login request of a particular user of the network device.

22. The apparatus as recited in claim 20, wherein the request from the network device for the first access control list comprises an authentication request that contains a name of the first access control list in a username attribute.

23. The apparatus as recited in claim 20, further comprising sequences of instructions which, when executed by the processor, cause the processor to perform:
processing a login request of a particular user of the network device;
providing, to the network device, a name of a first access control list that is associated with the particular user.

24. The apparatus as recited in claim 20, further comprising sequences of instructions which, when executed by the processor, cause the processor to perform:
receiving an update to a first access control list among the one or more access control lists;
appending a version identifier to a then-current name of the first access control list, to result in creating an updated name for the first access control list; and
storing the first access control list using the updated name.

25. The apparatus as recited in claim 20, wherein the instructions for receiving a request from the network device comprise sequences of instructions which, when executed by the processor, cause the processor to perform receiving the request from the network device for the first access control list only when the network device does not have the first access control list in a data store at the network device.

26. The apparatus as recited in claim 20, comprising an access, authentication, and accounting (AAA) server, and wherein the network device is a firewall.

* * * * *